United States Patent
Kato et al.

(10) Patent No.: US 11,469,643 B2
(45) Date of Patent: Oct. 11, 2022

(54) SCROLL COMPRESSOR HAVING AXIAL FAN AND DISCHARGE BRUSH

(71) Applicant: Hitachi Industrial Equipment Systems Co., Ltd., Tokyo (JP)

(72) Inventors: Fuminori Kato, Tokyo (JP); Yoshiyuki Kanemoto, Tokyo (JP)

(73) Assignee: Hitachi Industrial Equipment Systems Co., Ltd., Tokyo (JP)

(*) Notice: Subject to any disclaimer, the term of this patent is extended or adjusted under 35 U.S.C. 154(b) by 619 days.

(21) Appl. No.: 16/476,930

(22) PCT Filed: Jan. 19, 2018

(86) PCT No.: PCT/JP2018/001531
§ 371 (c)(1),
(2) Date: Jul. 10, 2019

(87) PCT Pub. No.: WO2018/142964
PCT Pub. Date: Aug. 9, 2018

(65) Prior Publication Data
US 2019/0334407 A1    Oct. 31, 2019

(30) Foreign Application Priority Data
Jan. 31, 2017    (JP) ............................. JP2017-015393

(51) Int. Cl.
*H02K 5/16* (2006.01)
*H02K 11/40* (2016.01)
(Continued)

(52) U.S. Cl.
CPC ......... *H02K 5/161* (2013.01); *F04C 18/0215* (2013.01); *F04C 29/04* (2013.01);
(Continued)

(58) Field of Classification Search
CPC ............ H02K 5/161; H02K 5/15; H02K 7/04; H02K 7/083; H02K 9/06; H02K 11/40;
(Continued)

(56) References Cited

U.S. PATENT DOCUMENTS 8,979,515 B2 *   3/2015   Iwano .................... F01C 21/06
                                                              418/101
9,115,719 B2 *   8/2015   Sadakata ............. F04C 15/0096
(Continued)

FOREIGN PATENT DOCUMENTS

CN   2556824 Y   6/2003
CN   2927476 Y   7/2007
(Continued)

OTHER PUBLICATIONS

English Machine Translation of JP2015-050798A translated on Feb. 8, 2022 by Espacenet. (Year: 2015).*
(Continued)

*Primary Examiner* — Dominick L Plakkoottam
*Assistant Examiner* — Paul W Thiede
(74) *Attorney, Agent, or Firm* — Crowell & Moring LLP

(57) ABSTRACT

A scroll compressor includes a rotor, a stator, a rotary shaft, an end bracket, an orbiting scroll, a fixed scroll, a suction type cooling fan, and a discharge brush. The discharge brush is fixed to the end bracket facing the cooling fan by a fixing member attached in a radial direction relative to the rotary shaft, and one end of which is in contact with the rotary shaft, in a space secured by the clearance.

4 Claims, 3 Drawing Sheets

(51) Int. Cl.
- F04C 18/02 (2006.01)
- F04C 29/04 (2006.01)
- F16C 17/02 (2006.01)
- H02K 5/15 (2006.01)
- H02K 7/04 (2006.01)
- H02K 7/08 (2006.01)
- H02K 9/06 (2006.01)
- H02K 21/24 (2006.01)
- H02K 16/02 (2006.01)
- H02K 5/14 (2006.01)
- H02K 1/2793 (2022.01)

(52) U.S. Cl.
CPC .............. *F16C 17/02* (2013.01); *H02K 5/15* (2013.01); *H02K 7/04* (2013.01); *H02K 7/083* (2013.01); *H02K 9/06* (2013.01); *H02K 11/40* (2016.01); *H02K 21/24* (2013.01); *F04C 2240/807* (2013.01); *F04C 2270/105* (2013.01); *F04C 2270/165* (2013.01); *F05C 2253/06* (2013.01); *F16C 2380/26* (2013.01); *H02K 1/2793* (2013.01); *H02K 5/148* (2013.01); *H02K 16/02* (2013.01)

(58) Field of Classification Search
CPC ...... H02K 21/24; H02K 1/2793; H02K 5/148; H02K 16/02; F04C 18/0215; F04C 29/04; F04C 2240/807; F04C 2270/105; F04C 2270/165; F04C 15/0096; F16C 17/02; F16C 2380/26; F05C 2253/06; F01C 21/06

See application file for complete search history.

(56) References Cited

U.S. PATENT DOCUMENTS

| | | |
|---|---|---|
| 2002/0028150 A1 | 3/2002 | Kawabata et al. |
| 2004/0233592 A1 | 11/2004 | Oh et al. |
| 2011/0179644 A1 | 7/2011 | Swanson et al. |
| 2012/0315174 A1 | 12/2012 | Iwano et al. |
| 2014/0097715 A1 | 4/2014 | Hall et al. |
| 2014/0154122 A1 | 6/2014 | Sadakata et al. |
| 2018/0152081 A1 | 5/2018 | Sakai et al. |

FOREIGN PATENT DOCUMENTS

| | | |
|---|---|---|
| CN | 102817843 A | 12/2012 |
| CN | 204131349 U | 1/2015 |
| DE | 20 2016 103 502 U1 | 9/2016 |
| ER | 2 738 390 A2 | 6/2014 |
| JP | H0953589 A * | 2/1997 |
| JP | 2008-537469 A | 9/2008 |
| JP | 2014-105693 A | 6/2014 |
| JP | 2015-50798 A | 3/2015 |
| JP | 2016-213935 A | 12/2016 |
| KR | 200476943 Y1 | 4/2015 |

OTHER PUBLICATIONS

Extended European Search Report issued in European Application No. 18748716.0 dated Sep. 29, 2020 (eight (8) pages).

International Search Report (PCT/ISA/210) issued in PCT Application No. PCT/JP2018/001531 dated Apr. 10, 2018 with English translation (four (4) pages).

Japanese-language Written Opinion (PCT/ISA/237) issued in PCT Application No. PCT/JP2018/001531 dated Apr. 10, 2018 (four (4) pages).

Chinese Office Action issued in Chinese Application No. 201880005813.6 dated Mar. 19, 2020 (seven (7) pages).

* cited by examiner

US 11,469,643 B2

SCROLL COMPRESSOR HAVING AXIAL FAN AND DISCHARGE BRUSH

TECHNICAL FIELD

The present invention relates to a scroll compressor.

BACKGROUND ART

In the related art, a scroll type compressor integrated with a motor is widely used. In the scroll type compressor integrated with a motor, generally, a cooling fan is mounted on a rotary shaft of a motor to cool a compression portion which becomes very hot during operation.

The motor driving the compressor has a problem such as electrolytic corrosion occurring in bearings. For example, if the motor operates from an inverter power supply at variable speeds, electrolytic corrosion tends to easily occur in the bearings due to a shaft voltage occurring in the rotary shaft. Since undesirable incidents such as shortening the life of the bearings occur due to electrolytic corrosion occurring in the bearings, it is required to reduce the shaft voltage of the motor so as to prevent such incidents.

For example, Patent Document 1 discloses an axial gap type permanent-magnet synchronous motor in which a brush in a brush holder attached to a fan cover is in contact with an end surface of a radial fan provided in an axial end portion of an end bracket, and thus a shaft voltage of the motor is reduced.

CITATION LIST

Patent Document

Patent Document 1: JP 2015-50798 A

SUMMARY OF THE INVENTION

Problems to be Solved by the Invention

In a configuration described in Patent Document 1, conduction between the fan cover with the brush holder attached thereto and a case housing is required to electrically couple the brush, which is in contact with the radial fan, to a ground potential. For this reason, in design perspective, the entire size of the compressor is likely to increase.

In this regard, an object of the present invention is to provide a scroll compressor capable of reducing a shaft voltage and achieving space savings.

Solutions to Problems

According to an exemplary embodiment of the present invention, there is provided a scroll compressor including a rotor that is stored in a motor casing; a stator that is stored in the motor casing, and drives the rotor to rotate; a rotary shaft that is held by bearings, and rotates integrally with the rotor; an end bracket through which one end portion of the rotary shaft passes, and which seals the motor casing; an orbiting scroll that supports the other end portion of the rotary shaft, and orbits as the rotary shaft rotates; a fixed scroll that is disposed facing the orbiting scroll; a suction type cooling fan which is fixed to one end portion of the rotary shaft while being apart by a clearance from the end bracket, and which suctions outside air through a suction port provided in an end surface of a fan cover, the end surface facing the end bracket, and generates cooling wind for cooling the fixed scroll or the orbiting scroll in the fan cover, as a rotary vane accommodated in the fan cover rotates; and a discharge brush which is fixed to the end bracket facing the cooling fan and one end of which is in contact with the rotary shaft.

Effects of the Invention

According to the present invention, it is possible to realize the scroll compressor capable of reducing a shaft voltage and achieving space savings.

MODE FOR CARRYING OUT THE INVENTION

Example

Figure 1:
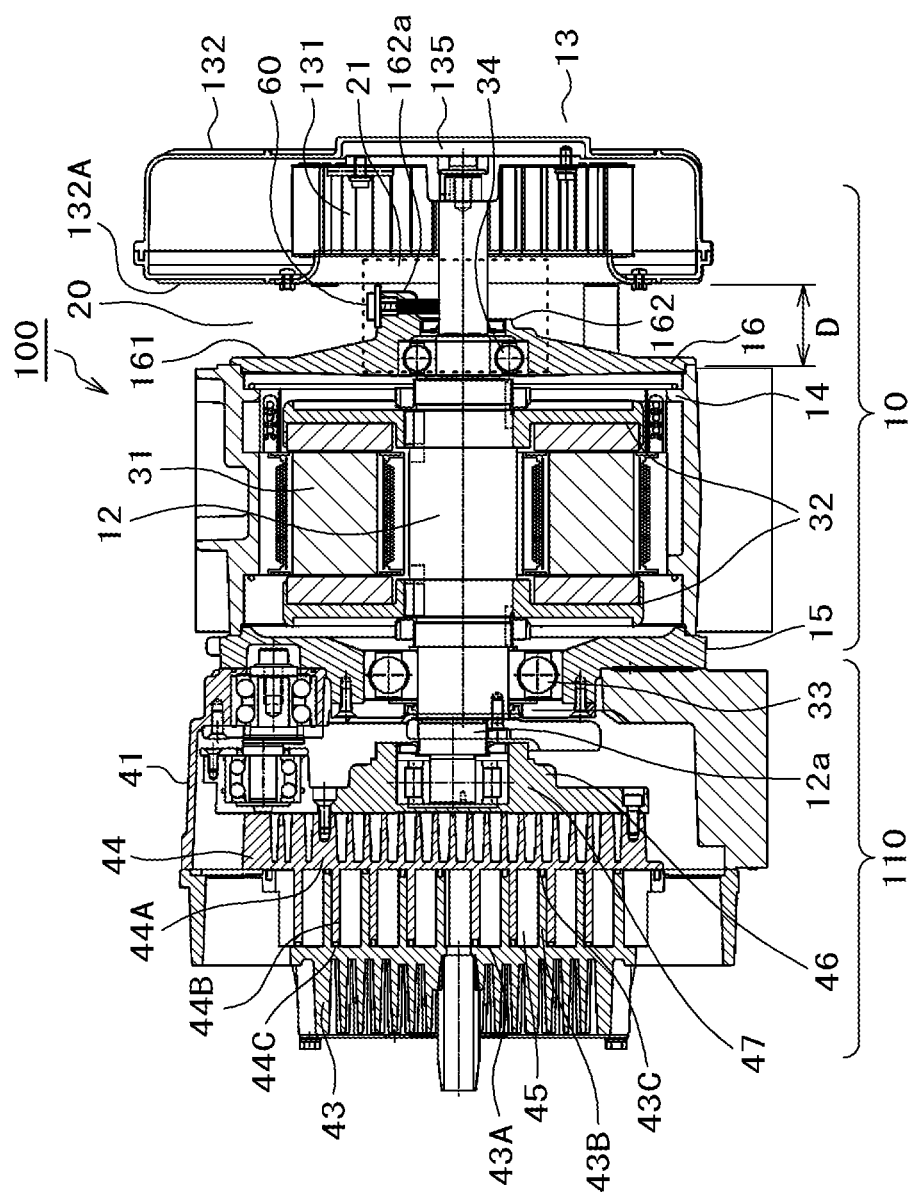
FIG. 1 is a lateral cross-sectional view of a scroll compressor 100 in an example.

FIG. 1 is a lateral cross-sectional view of a scroll compressor 100 in an example. The scroll compressor 100 has a motor 10, and a compression portion 110 driven by the motor 10. Hereinbelow, an example of a configuration of an axial gap type motor applied as the motor 10 will be described.

A stator 31 having a disk shape is disposed in a motor casing 14 of the motor 10, and is interposed between a pair of rotors 32 having a disk shape. The motor casing 14 is made of metal such as Al, and has a cylindrical shape having openings at both ends. A flange 15 made of metal is provided in one opening of the motor casing 14, one opening being located adjacent to the compression portion 110, and an end bracket 16 made of metal is provided in the other opening opposite to one opening. Both openings are sealed.

A rotary shaft 12 is provided passing through central portions of the stator 31 and the rotors 32. The rotary shaft 12 is rotatably supported by a main bearing 33 provided adjacent to the compression portion 110, and a non-load bearing 34 which is provided opposite to the main bearing 33 such that the stator 31 is interposed between the non-load bearing 34 and the main bearing 33. The main bearing 33 is held by the flange 15, and the non-load bearing 34 is held by the end bracket 16. The rotary shaft 12 has an eccentric part 12a in an end portion located adjacent to the main bearing 33.

An end portion of the rotary shaft 12, the end portion being located adjacent to the non-load bearing 34, passes through the end bracket 16, and a cooling fan 13 is installed in the end portion. The cooling fan 13 is configured such that a rotary vane 131 mounted on the rotary shaft 12 is accommodated in a fan cover 132 made of resin. A counter weight 135 is provided in an end portion of the rotary shaft 12, and between the rotary vane 131 and the fan cover 132.

The cooling fan 13 is provided apart by a clearance, specifically, a predetermined distance D from the end bracket 16 to secure a space 20 for suctioning air.

The distance D is a distance between a surface 161 of the end bracket 16, the surface 161 facing the cooling fan 13 (hereinbelow, simply referred to as the surface 161 of the end bracket 16), and an end surface 132A of the fan cover 132, the end surface 132A facing the end bracket 16 (hereinbelow, simply referred to as the end surface 132A of the fan cover 132).

The cooling fan 13 is a so-called suction type cooling fan which suctions outside air flowing into the space 20 from the side of the cooling fan, through a suction hole (not illustrated) provided in the end surface 132A, to generate cooling wind, as the rotary vane 131 is driven to rotate by the rotary shaft 12.

The majority of outside air, which has flowed into the space 20 and has stayed adjacent to the cooling fan 13, is suctioned into the cooling fan 13 through a suction port on an outer diameter side of the cooling fan 13. The cooling wind generated in the fan cover 132 by the rotation of the rotary vane 131 is supplied to a fixed scroll 43 or an orbiting scroll 44 (will be described later) of the compression portion 110 through a duct (not illustrated).

A gap is formed between the stator 31 and each of the rotors 32. Therefore, the stator 31 and the rotors 32 are accommodated in the motor casing 14 in a state where the stator 31 and each of the rotors 32 are disposed facing each other with the gap therebetween in a direction parallel to the rotary shaft 12.

Figure 2:
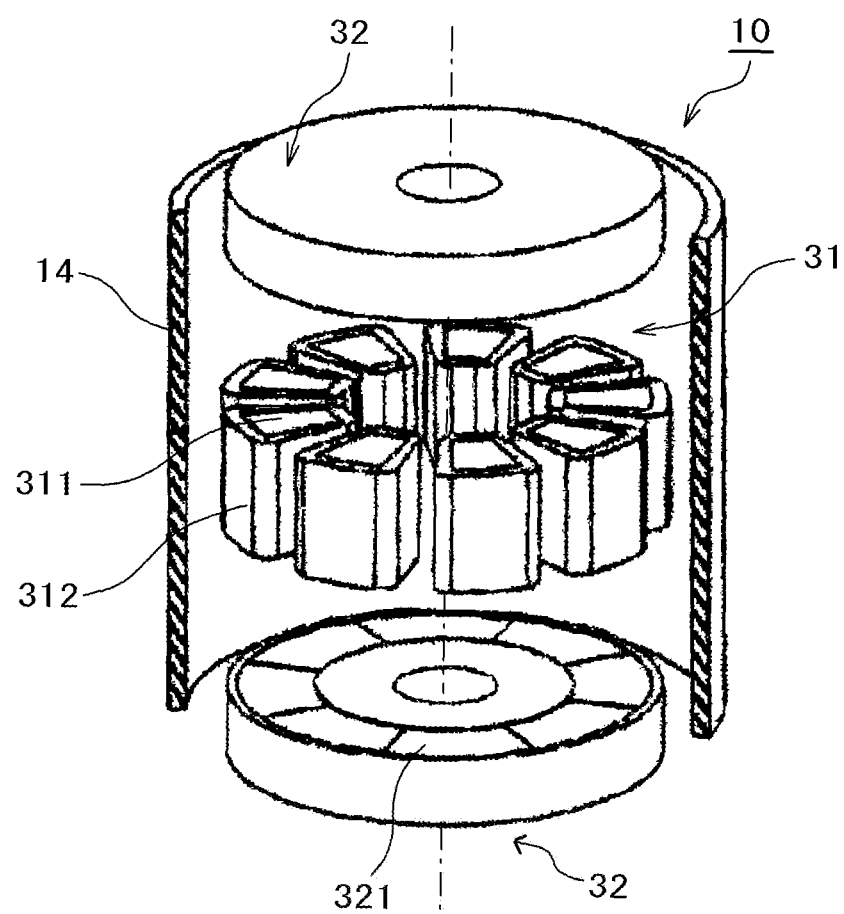
FIG. 2 is a magnified view of a stator 31 and rotors 32 of a motor 10 illustrated in FIG. 1.

The stator 31 and the rotors 32 of the motor 10 illustrated in FIG. 1 are illustrated in a magnified manner in FIG. 2. Each of the rotors 32 includes a yoke (not illustrated) formed of a magnetic body, and permanent magnets 321 which are disposed in a circumferential direction and are connected to the yoke.

The stator 31 is configured such that a plurality of core pieces 311 are disposed equally spaced from each other in the circumferential direction. A coil 312 is wound around each of the core pieces 311 in a state where a non-magnetic body is interposed therebetween. The core pieces 311 disposed in the circumferential direction are resin-molded over with a resin material such that the core pieces 311 are integrally formed. The core pieces 311 are fixed to the motor casing 14. The core piece 311 can be formed of flat rolled magnetic steel sheet, or amorphous metal.

If current flows through the coils 312 wound around the core pieces 311 of the stator 31, a rotational force is exerted to the rotors 32 by a magnetic field generated in the stator 31 and the rotors 32. The rotary shaft 12 rotates as the rotors 32 rotate.

Since amorphous metal has a very low loss and a high permeability compared to other magnetic materials, if the core piece 311 is formed of amorphous metal, it is possible to obtain a high motor efficiency. On the other hand, since in addition to having a high hardness and being brittle, amorphous metal is used after being processed into a relatively thin sheet, amorphous metal is not suitable for processes such as punching. In the axial gap type motor, the stator 31 can be formed of the core piece 311 obtained by stacking relatively easily fabricable fan-shaped (refer to FIG. 2) foil straps on top of each other. Therefore, the stator 31 can be fabricated without being processed, such as being punched into a complex shape, the axial gap type motor is suitable for the use of amorphous metal.

An end surface 162a perpendicular to an axial direction of the rotary shaft 12 is formed on the surface 161 of the end bracket 16, specifically, in a shaft-through portion 162 through which the rotary shaft 12 passes, and a discharge brush 60 is fixed to the end surface 162a.

Figure 3:
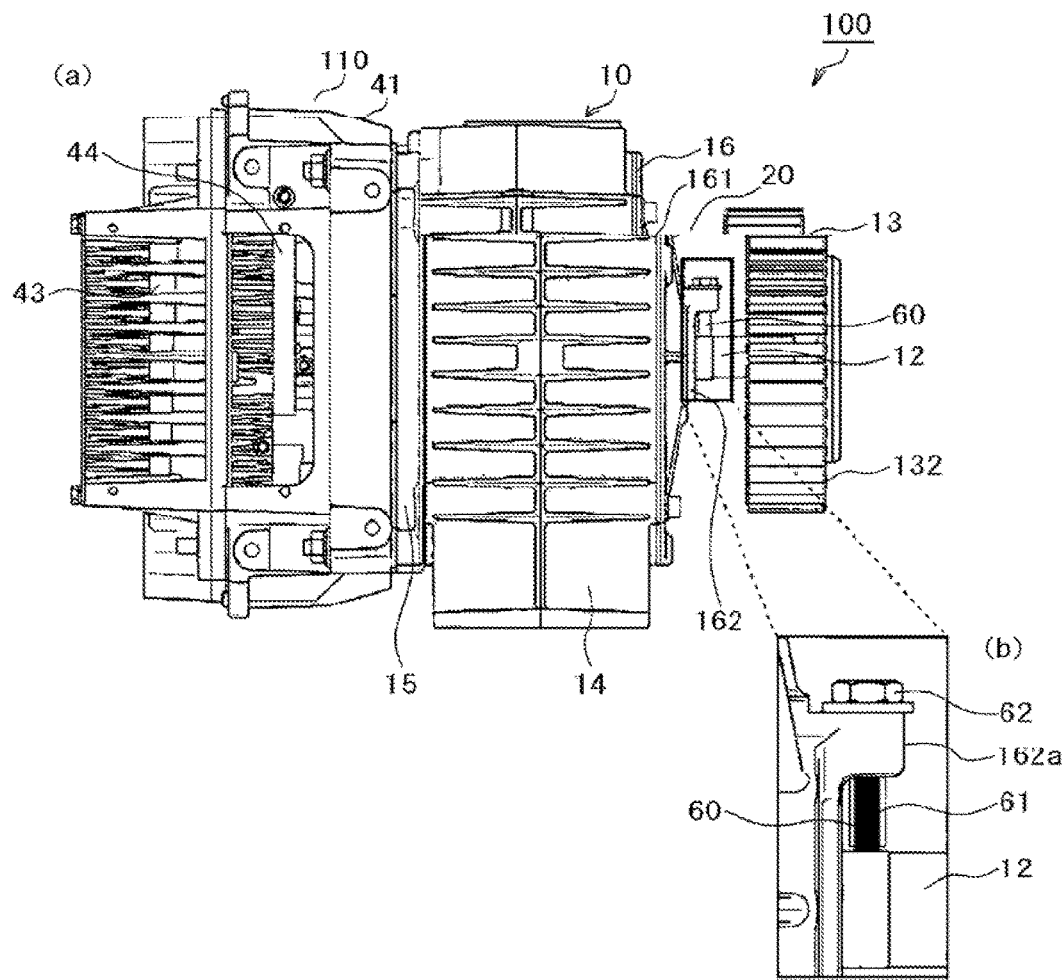
FIG. 3 is a lateral view of the scroll compressor 100 in the example.

FIG. 3(a) illustrates a lateral view of the scroll compressor 100 illustrated in FIG. 1, and the discharge brush 60 and adjacent parts of the discharge brush 60 illustrated in FIG. 3 (a) are illustrated in a magnified manner in FIG. 3(b). The discharge brush 60 is, for example, a carbon brush. As illustrated in FIG. 3(b), if an upper end surface of the discharge brush 60 is pressed by a screw 62 inserted into a bolt 61 formed in the end surface 162a of the shaft-through portion 162, a lower end surface of the discharge brush 60 comes into press contact with a surface of the rotary shaft 12.

In a case where current flows through the coils 312 from an inverter power supply, for example, when the motor is driven, if the rotary shaft 12 rotates at a high speed, a shaft voltage occurs in the rotary shaft 12. As illustrated in FIG. 1, bearings such as the main bearing 33 and the non-load bearing 34 are held by the flange 15 and the end bracket 16, respectively. In the bearings, bearing inner rings are in contact with the rotary shaft 12, and bearing outer rings are in contact with the flange 15 and the end bracket 16. Therefore, as described above, if a shaft voltage occurs in the rotary shaft 12, a potential difference between the flange or the end bracket 16 and the rotary shaft 12 occurs between the inner and outer rings of the bearings. If the potential difference exceeds dielectric strengths of oil films of the bearings, current flows through the bearings due to dielectric breakdown of the oil films, and electrolytic corrosion occurs in the bearings.

As described above, the scroll compressor 100 in the example is grounded owing to the discharge brush 60 coming into contact with the surface of the rotary shaft 12, and thus the current occurring in the rotary shaft 12 can be discharged from the bolt 61 and the screw 62 to the end bracket 16 and the motor casing 14 via the discharge brush 60, and the shaft voltage can be reduced. Therefore, it is possible to prevent electrolytic corrosion from occurring in the bearings. In addition to the bolt 61 and the screw 62, for example, a spring can be used to fix the discharge brush 60.

Particularly, since a facing area of the stator 31 and each of the rotors 32 is large in the axial gap type motor, a capacitance is likely to become large. For this reason, compared to, for example, a radial gap type motor, in the axial gap type motor, a higher shaft voltage is likely to occur in the rotary shaft 12, and electrolytic corrosion occurs more noticeably in the bearings.

As described above, in the scroll compressor 100 of the example, since the discharge brush 60 fixed to the end bracket is in press contact with the rotary shaft 12, even though a high shaft voltage occurs in the rotary shaft 12, it is possible to reduce the shaft voltage, and to prevent electrolytic corrosion from occurring in the bearings.

In the example illustrated in FIGS. 1 and 3, the discharge brush 60 and the screw 62 fixing the discharge brush are provided being exposed to the outside of the scroll compressor 100. Specifically, when the space 20 between the end bracket 16 and the cooling fan 13 is seen from an outer diameter side of the motor 10 and the cooling fan 13, the screw 62 is provided such that a head of the screw 62 is visible.

In the example illustrated in FIGS. 1 and 3, the magnitude of the distance D between the surface 161 of the end bracket 16 and the end surface 132A of the fan cover 132 is secured to allow securing the amount of suction of the outside air which is required for the cooling fan 13 to generate cooling wind, and to allow a tool such as a driver to be inserted into the space 20 from the outside of the scroll compressor 100.

Therefore, when detaching the discharge brush 60 from the end bracket 16, for example, to replace or repair the discharge brush 60, it is possible to directly insert a tool such as a driver into the space 20 from the outer diameter side of the motor 10 and the cooling fan 13, and to perform an operation, such as loosening the screw 62 exposed to the outside. As a result, it is possible to easily detach the discharge brush 60 without detaching the end bracket 16 or the fan cover 132. For this reason, compared to a configuration in which the discharge brush 60 is installed in the motor casing 14 or in the fan cover 132, it is possible to improve maintainability of the discharge brush 60.

As illustrated in FIG. 1, the compression portion 110 has the fixed scroll 43, and the orbiting scroll 44 disposed facing the fixed scroll 43. The fixed scroll 43 and the orbiting scroll 44 are stored in a main body casing 41.

The main body casing 41 is a cylindrical body having openings at both ends. The fixed scroll 43 is attached to one opening, and the motor 10 is attached to the other opening.

Spiral wrap portions 43B and 44B are formed on a surface of a mirror plate 43A of the fixed scroll 43, and a surface of a mirror plate 44A of the orbiting scroll 44, respectively. The wrap portion 43B of the fixed scroll 43 meshes with the wrap portion 44B of the orbiting scroll 44 such that a compression chamber 45 is formed. Tip seals 43C and 44C are provided at a tip of the wrap portion 43B of the fixed scroll 43, and a tip of the wrap portion 44B of the orbiting scroll 44, respectively.

An orbiting bearing 47 is provided in a boss part 46 on a back surface of the orbiting scroll 44. The eccentric part 12a of the rotary shaft 12 is inserted into the orbiting bearing 47, and thus the eccentric part 12a of the rotary shaft 12 is supported by the orbiting scroll 44.

The eccentric part 12a of the rotary shaft 12 eccentrically moves as the rotary shaft 12 rotates. Therefore, if the rotary shaft 12 is driven to rotate by the motor 10, the orbiting scroll 44 in contact with the eccentric part 12a orbits.

Since an eccentricity of the orbiting scroll 44 is counteracted by the rotation of the counter weight 135 attached to the end portion of the rotary shaft 12, the orbiting scroll 44 orbits continuously.

If the orbiting scroll 44 orbits, the volume of the compression chamber 45 defined between the wrap portion 43B of the fixed scroll 43 and the wrap portion 44B of the orbiting scroll 44 is continuously reduced. Therefore, a fluid introduced into the compression chamber 45 is compressed, and compressed air is discharged to the outside of the compression portion 110. One of a plurality of the compression chambers 45 functions as a suction port of the fluid, and another of the plurality of compression chambers 45 functions as a discharge port of the compressed fluid, which are not illustrated.

As described above, in the scroll compressor 100 of the example, it is possible to make effective use of the space 20 secured to suction outside air by fixedly installing the discharge brush 60 on the surface 161 of the end bracket 16. As described above, since the majority of outside air, which has flowed into the space 20, is suctioned through the suction port on the outer diameter side of the cooling fan 13, a region 21 on an inner diameter side of the space 20 makes no contribution to suctioning outside air at all, actually, is a dead space. In the scroll compressor 100 of the example, it is possible to make effective use of the region 21, which is a dead space in the space 20, by fixedly installing the discharge brush 60 on the surface 161 of the end bracket 16. Therefore, it is possible to prevent undesirable incidents such as failures induced due to electrolytic corrosion occurring in the bearings, to reduce the entire size of the compressor, and to achieve space savings.

In addition, some outside air passes through also the region 21 on the inner diameter side of the space 20 between the end bracket 16 and the cooling fan 13. For this reason, if the discharge brush 60 is installed in the region 21, a sliding surface of the discharge brush 60 is cooled by the outside air. Therefore, it is possible to prolong the brush life of the discharge brush 60.

In addition, in the scroll compressor 100 of the example, even though a high shaft voltage occurs in the rotary shaft 12, it is possible to reduce the shaft voltage via the discharge brush 60. Therefore, in the axial gap type motor in which the stator 31 is made of an amorphous alloy, it is possible to obtain a high motor efficiency, and to prevent undesirable incidents such as failures induced due to electrolytic corrosion occurring in the bearings.

In addition, in the scroll compressor 100 of the example, the discharge brush 60 is fixedly installed on the surface 161 of the end bracket 16, and thus the counter weight 135 can be installed in the end portion of the rotary shaft 12, which is located adjacent to the cooling fan 13. Therefore, it is possible to reduce a weight of the counter weight 135 which is required to counteract the eccentricity of the rotary shaft 12, and it is possible to reduce the weight of the counter weight 135.

That is, in a configuration where a discharge brush is installed in an end portion of a rotary shaft in the related art, it is not possible to install the counter weight 135 in the end portion of the rotary shaft 12, and it is necessary to install the counter weight 135 closer to a center than to the end portion of the rotary shaft 12. In this case, the weight of the counter weight 135, which is required to counteract the eccentricity of the rotary shaft 12, becomes heavy.

In addition, in the scroll compressor 100 of the example, the discharge brush 60 is fixedly installed on the surface 161 of the end bracket 16, and thus conduction between the fan cover 132 and the discharge brush 60 or the motor casing 14 is not required. Therefore, it is possible to employ a cover made of resin as the fan cover 132, to reduce manufacturing costs of the scroll compressor 100, and to reduce the entire weight of the scroll compressor 100.

That is, in a configuration where a discharge brush is provided being in contact with a fan cover in the related art, it is necessary to use a fan cover made of metal, and manufacturing costs increase to that extent.

In the scroll compressor 100 of the example, the fan cover 132 is not necessarily limited to a fan cover made of resin, and a cover made of metal can be employed.

As described above, the scroll compressor 100 of the example has a configuration in which an axial gap type motor is employed as the motor 10. The present invention is not limited to the configuration, and a motor with another configuration, for example, a radial gap type motor can be used as the motor 10.

REFERENCE SIGNS LIST

100 Scroll compressor
10 Motor
110 Compression portion
12 Rotary shaft
12a Eccentric part
13 Cooling fan
131 Rotary vane
132 Fan cover
132A End surface
135 Counter weight
14 Motor casing
15 Flange
16 End bracket
161 Surface
162 Shaft-through portion 162a End surface
20 Space
21 Region
31 Stator
311 Core piece
312 Coil
32 Rotor
321 Permanent magnet
33 Main bearing
34 Non-load bearing
41 Main body casing
43 Fixed scroll
44 Orbiting scroll
43A, 44A Mirror plate
43B, 44B Spiral wrap portion
43C, 44C Tip seal
45 Compression chamber
46 Boss part
47 Orbiting bearing
60 Discharge brush
61 Bolt
62 Screw
D Distance

The invention claimed is:

1. A scroll compressor comprising:
a rotor that is stored in a motor casing;
a stator that is stored in the motor casing, and drives the rotor to rotate;
a rotary shaft that is held by bearings, and rotates integrally with the rotor;
an end bracket through which one end portion of the rotary shaft passes, and which seals the motor casing;
an orbiting scroll that supports the other end portion of the rotary shaft, and orbits as the rotary shaft rotates;
a fixed scroll that is disposed facing the orbiting scroll;
a suction type cooling fan which is fixed to the one end portion of the rotary shaft while being apart by a clearance from the end bracket, and which suctions outside air through a suction port provided in an end surface of a fan cover, the end surface facing the end bracket, and generates cooling wind for cooling the fixed scroll or the orbiting scroll in the fan cover, as a rotary vane accommodated in the fan cover rotates;
a discharge brush which is fixed to the end bracket facing the cooling fan by a fixing member attached in a radial direction relative to the rotary shaft, and one end of which is in contact with the rotary shaft, in a space secured by the clearance; and
a counter weight that is provided in the one end portion of the rotary shaft, the one end portion being located adjacent to the cooling fan.

2. The scroll compressor according to claim 1, wherein the discharge brush and the fixing member fixing the discharge brush to the end bracket are exposed to an outside in the space.

3. The scroll compressor according to claim 1, wherein the stator is configured such that a plurality of coil-wound core pieces are disposed in a circumferential direction, and
wherein the stator and the rotor are disposed facing each other with a gap therebetween in a direction parallel to the rotary shaft.

4. The scroll compressor according to claim 3, wherein each core piece is formed of amorphous metal.

* * * * *